(12) United States Patent
Schulze

(10) Patent No.: US 8,835,794 B2
(45) Date of Patent: Sep. 16, 2014

(54) PROCEDURE FOR MAKING A LOW DISTORTION WELDED CONNECTION

(75) Inventor: Bernd Schulze, Niederdorf (DE)

(73) Assignee: Koki Technik Transmission Systems GmbH, Niederwuerschnitz (DE)

( * ) Notice: Subject to any disclaimer, the term of this patent is extended or adjusted under 35 U.S.C. 154(b) by 620 days.

(21) Appl. No.: 13/058,478

(22) PCT Filed: Aug. 10, 2009

(86) PCT No.: PCT/EP2009/005787
§ 371 (c)(1),
(2), (4) Date: Mar. 23, 2011

(87) PCT Pub. No.: WO2010/017942
PCT Pub. Date: Feb. 18, 2010

(65) Prior Publication Data
US 2011/0163073 A1  Jul. 7, 2011

(30) Foreign Application Priority Data

Aug. 13, 2008  (DE) .................. 10 2008 038 929

(51) Int. Cl.
| | | |
|---|---|---|
| B23K 35/38 | (2006.01) |
| B23K 9/00 | (2006.01) |
| B23K 15/00 | (2006.01) |
| B23K 26/22 | (2006.01) |
| B23K 26/06 | (2014.01) |
| B23K 26/24 | (2014.01) |

(52) U.S. Cl.
CPC .......... *B23K 26/0621* (2013.01); *B23K 9/0026* (2013.01); *B23K 15/0006* (2013.01); *B23K 26/22* (2013.01); *B23K 26/24* (2013.01)
USPC .......................................................... 219/75

(58) Field of Classification Search
USPC ................................. 219/75, 121.14, 121.64
See application file for complete search history.

(56) References Cited

U.S. PATENT DOCUMENTS

| 4,462,533 | A | * | 7/1984 | Furr et al. .................. 228/119 |
| 5,841,098 | A | * | 11/1998 | Gedrat et al. ............ 219/121.63 |
| 6,927,357 | B2 | * | 8/2005 | Schmidt et al. ................. 219/89 |

FOREIGN PATENT DOCUMENTS

| DE | 19639667 | 3/1998 |
| DE | 10248955 | 6/2004 |
| EP | 1640111 | 3/2006 |
| JP | 61229489 | 10/1986 |

* cited by examiner

*Primary Examiner* — Dana Ross
*Assistant Examiner* — Renee L Miller
(74) *Attorney, Agent, or Firm* — Bachman & LaPointe, P.C.

(57) ABSTRACT

In a process to connect components, especially metal components (1, 2), by at least one welding process, the components (1, 2) are at first brought together, or joined together, and are then simultaneously welded together at—at least—two differently located joining spots (3, 4) by a laser welding process and with the aid of robot control.

5 Claims, 1 Drawing Sheet

3
PROCEDURE FOR MAKING A LOW DISTORTION WELDED CONNECTION

The invention is concerned with a procedure for making a low distortion welded connection between components, especially between metal components.

STATE OF THE ART

As widely known, welding is a process of joining two or more materials in a firmly bonded connection, which process is mainly based on a treatment with heat. In said process, welding can take place with or without additional materials.

Generally speaking, however, especially metal components can, when thus joined thermally, become distorted, which can make it especially difficult to keep within predetermined building masses and tolerance ranges.

In this instance, the amount of distortions can depend on several factors, such as the input of heat, and the capacity to relieve inherent tensions inside the components, as well as the respective component restraints in the welding devices and/or the welding procedure.

TASK OF THE INVENTION

This is where the invention comes in, which is based on the task of proposing a simple procedure by which especially metal components can be joined by welding, with which process a possible distortion during the welding process is minimized.

FULFILLMENT OF THE TASK

This task is fulfilled in accordance with the invention by first bringing, or joining, together the components which require connecting, and then simultaneously welding them together at two, spatially separated, different joining spots.

In such a simultaneous welding process at two joining spots, at least, which are, in terms of location, spaced apart from each other, potentially inherent tensions of the components can practically be "frozen" and thus practically be made harmless. Also distortions possibly arising in the following welding procedure itself can thus advantageously be minimized. Potential inherent tensions in components which are to be welded can, mind you, also be reduced by heating them to a glow to free them of tension, which process, however, constitutes a significant further manufacturing step entailing additional cost.

In such a simultaneous welding process of at least two spatially differentiated joining spots, it has proven especially beneficial that the welding process at joining spots lying opposite to each other is carried at in parallel, i.e. that a welded connection be made simultaneously on both sides of at least two components requiring connecting.

A further advantage can possibly be achieved, if the components which are to be welded, after joining them together, are held in their positions, at least during the welding process and at least in their joining area, by the pressure from a pressing force. But for certain aims it can also be suitable, after joining them, to keep in its position each of the components to be welded.

Especially with technically high value components and with relatively high manufacturing output numbers, such as with switch elements of switch gears, it may be beneficial to carry out the simultaneous welding processes by utilizing a laser welding process. However, metal protective gas welding procedures, so-called MPG [MSG] welding processes, or laser- and/or MPG-tandem-welding procedures should be feasible as well.

The simultaneous welding processes can suitably be carried out by robot arms moving in parallel to each other, in which instance a collision evaluation for its welding head is also advisable, to make sure said head pieces cannot collide with a device structure aimed at fixating the components to be welded together.

Finally, the welded connection, which is laterally to be made at both joining spots, in each instance by one welding seam or several welding beads, in which instance the latter may provide additional economy on cost and effort for welding, in terms of energy and, in some cases, additional materials.

In praxis, this process has proven to achieve the best results in the field of so-called beam welding procedures. Somewhat poorer results are achieved in the so-called metal-inert gas-welding procedure, because in this welding procedure, the input of energy into the components is too high.

The only function of the joining spots is to prefix the components before the actual welding through, but they are positioned within the following welding seam.

For the underlying idea of the invention it is not necessary to discuss in detail in which form the subsequent welding through is carried out. Welding all the way through from one joining spot to the other is conceivable, but so is beginning between joining spots in direction of the next joining spot.

Likewise, it is irrelevant at which side of the joining spot the welding through is initiated. In this context, simultaneous welding leads to a better utilization of the welding machine's capacity, and consequently, to a time saving effect. However, the scope of the idea underlying the invention also includes the possibility of welding first one side of the work piece from one joining spot to another and, subsequently, on the other side in opposite or in the same direction from one joining spot to another.

DESCRIPTION OF DRAWINGS

Further characteristics and advantages of the herein presented invention follow from the description included below and from two embodiments in connection with the drawing, also included below; these show in.

Figure 1:
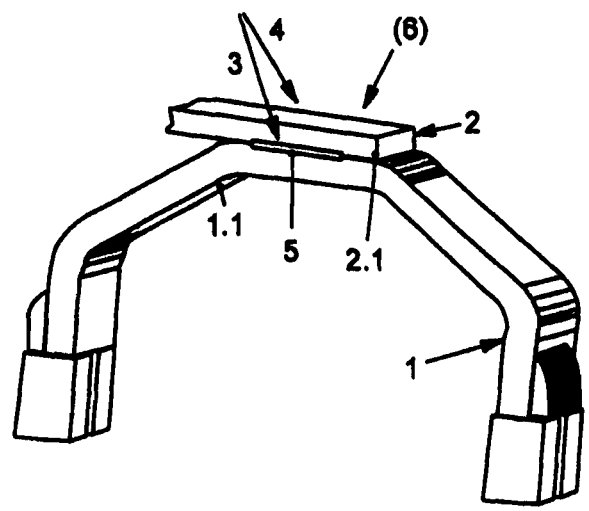
FIG. 1 an illustration in perspective of a welded connection by one welding seam in each instance, between a selector fork of a switch gear and a subcomponent of a fork transporter and FIG. 2 a simplified illustration in perspective of a welding device for the manufacturing of the welded connection according to FIG. 1, however here, instead of one welding seam on both sides, a row of welding beads on both sides is included in the design.

The two components shown in FIG. 1—referred to as 1 and 2—belong to a gearbox, in which instance component 1 is designed as a switch fork and as a partially shown component 2, a fork transporter is planned. Both components 1 and 2 have contact with each other in an overlapping joining area, which is formed by the cross bar 1.1 of the switch fork 1 and the free end 2.1 of the fork transporter 2. The joining spots thus formed, indicated by arrows 3 and 4, have, in this first embodiment, simultaneously been welded together by welding seams 5 and (6

Figure 2:
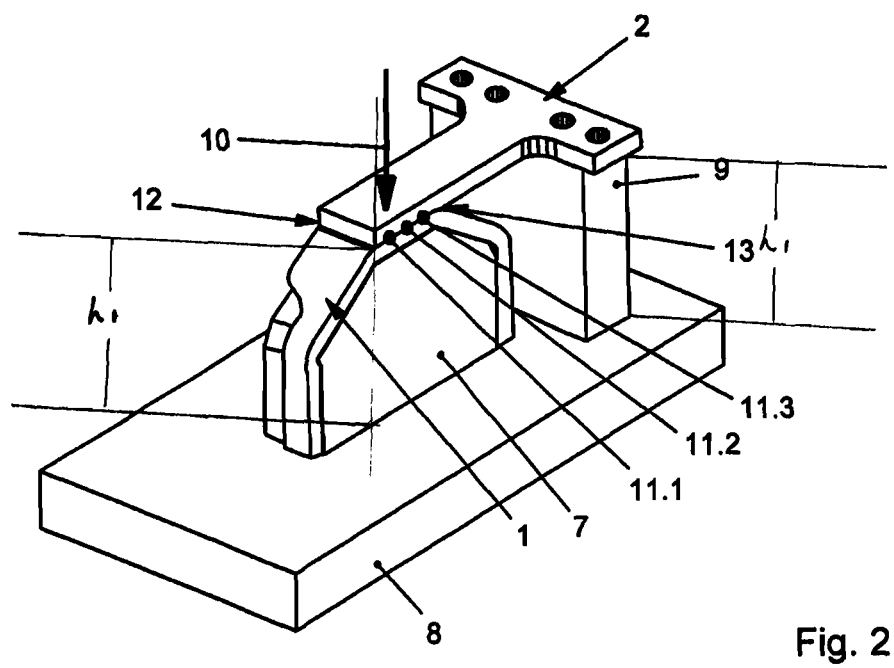

The possible welding device, illustrated in a simplified manner in FIG. 2, aimed at welding together the switch fork 1 with the fork transporter 2, possesses an inner shape of the receiver block 7, which inner shape has been formed in a manner corresponding to the switch fork 1, which receiver block, on the other hand, is fixed to a base plate 8.

The fork transporter 2, in this welding device, lies with its t-shaped end piece on a support block 9 and can incidentally be fixed with said bearing block by screws. It is, however, quicker to fix the two components which are to be welded by planning a pressing force 10, which is indicated by the thick arrow in FIG. 2.

In the second embodiment of a welded connection, shown in FIG. 2, of a welding device, instead of the welding seams 5 and (6), which are positioned bilaterally at the joining spots 3 and 4, only several welding beads 11.1-11.3 are planned, of which the first welding bead 11.1 and the hindmost welding bead 11.3 are placed, in each instance, approximately 2 mm from beginning and end—indicated as 12 and 13—of the joining area 1.1/2.1 of the welded connection.

The herein presented invention's manner of functioning is as follows:

To weld together the two components 1 and 2, i.e. the switch fork 1 with the fork transporter 2, the switch fork 1 with its inner shape is inserted on to the correspondingly shaped receiver block 7, whereupon the fork transporter 2 with its free end is laid to a fit on the cross bar 1.1 of the switch fork 1, in which instance the free end 2.1 is subsequently by the pressing force 10 is pressed on to the cross bar 1.1 during the welding process and thus held in a fixed position.

Subsequently, the welding seams 5 and (6) are produced simultaneously at the two joining spots 4 and 4, which process is aided by two robot arms, not shown here, which are in synchronized motion, by which process a possible distortion of the two components 1 and 2 is advantageously avoided, or minimized.

In the first embodiment according to FIG. 1, welding was carried out with a laser power of 1.9 kW, in which instance the geometry of the welding seams 5 and (6) was preserved at a feed of 1000 mm/min, a welding seam depth of 3.2 mm on average and a welding seam width of 1.2 mm on average. When feed was raised to approximately 1500 mm/min in a similar welding process, the mean welding seam depth was approximately 2.7 mm and the mean welding seam width was approximately 0.9 mm.

Alternatively, it is, in accordance with FIG. 2 also possible, instead of the welding seams 5 and (6), to position bilaterally, for example, three welding beads 11.1-11.3, in which instance these are then to be placed in an engaged position, preferably by at least 2 mm at the joining spots 3 and 4. Also in this instance, the process has resulted in an advantageous low distortion welded connection, which additionally, in justified cases, even can be glowed to low tension, in which instance the respective strain proof qualities of the welded connection are minimally reduced.

On the whole, a process by which to connect especially metal components has been developed with which advantageously component distortion during the thermal joining can substantially be avoided or at least minimized, which constitutes a by no means insignificant progress for such and similar welded connections.

REFERENCE NUMBER LIST

1 Switch fork
2 Fork transporter
3 Joining spot
4 Joining spot
5 Welding seam
6 Welding seam
7 Receiver block
8 Base plate
9 Bearing block
10 Pressing force
11 Welding beads
12 Beginning
13 End

The invention claimed is:

1. A method for producing a switch fork with a fork transporter by a low-distortion welded connection comprising the steps of:
   providing a receiver block having an outer shape;
   placing a switch fork on the receiver block wherein the shift fork has an inner shape corresponding to the outer shape of the receiver block wherein a height from a top surface of the receiver block to a top surface of the switch fork is $h_1$;
   providing a bearing block of height $h_1$;
   locating a fork transporter on the bearing block and the top surface of the switch fork;
   spot welding the switch fork and fork transporter to each other simultaneously while applying a pressure force to a top surface of the fork transporter at at least two spatially different locations to define joining spots so that the switch fork and fork transporter are prefixed at the joining spots; and
   thereafter simultaneously producing welding seams at the joining spots.

2. A process according to claim 1, wherein the simultaneous welding processes are carried out by a process of laser welding or electron welding.

3. A process according to claim 2, wherein the simultaneous welding processes are carried out by metal-inert-gas (MIG) welding.

4. A process according to claim 2, wherein the welding processes carried out is one of laser and MPG tandem-welding.

5. A process according to claim 1, wherein the process of simultaneous welding of the components is carried out at joining spots lying opposite to each other.

* * * * *